(12) United States Patent
Yonge, III et al.

(10) Patent No.: US 7,894,487 B2
(45) Date of Patent: *Feb. 22, 2011

(54) TIME SYNCHRONIZATION IN A NETWORK

(75) Inventors: Lawrence W. Yonge, III, Ocala, FL (US); Srinivas Katar, Ocala, FL (US); Timothy J. Vandermey, Altamonte Springs, FL (US); James E. Petranovich, La Jolla, CA (US); Neal K. Riedel, Carlsbad, CA (US); George M. Peponides, Encinitas, CA (US); Sherman Leon Gavette, Camas, WA (US)

(73) Assignees: Sharp Corporation, Tenri Nara (JP); CopperGate Communications Ltd., Tel Aviv (IL); Atheros Communications, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/431,433

(22) Filed: Apr. 28, 2009

(65) Prior Publication Data

US 2009/0207865 A1    Aug. 20, 2009

Related U.S. Application Data

(63) Continuation of application No. 11/339,293, filed on Jan. 24, 2006, now Pat. No. 7,558,294.

(60) Provisional application No. 60/702,717, filed on Jul. 27, 2005, provisional application No. 60/705,720, filed on Aug. 2, 2005.

(51) Int. Cl.
*H04J 3/06* (2006.01)
*H04J 3/14* (2006.01)
*H04L 12/413* (2006.01)
*G08B 1/08* (2006.01)
*H04M 9/00* (2006.01)

(52) U.S. Cl. .................. 370/509; 370/236; 370/445; 340/538; 455/402

(58) Field of Classification Search .......... 370/235–236, 370/445–447, 503–520; 340/310.11, 538; 455/402
See application file for complete search history.

(56) References Cited

U.S. PATENT DOCUMENTS 5,359,625 A    10/1994    Vander Mey et al.

(Continued)

FOREIGN PATENT DOCUMENTS

WO    WO 03/100996    12/2003

(Continued)

OTHER PUBLICATIONS

European Search Report, European Patent Office, European Patent Application No. 06253916.8-1246, Oct. 31, 2006, 8 pages.

(Continued)

*Primary Examiner*—Tri H Phan
(74) *Attorney, Agent, or Firm*—Fish & Richardson P.C.

(57) ABSTRACT

A method and corresponding system for communicating between stations in a network is presented. The method includes providing repeated beacon transmissions from a coordinator station for coordinating transmissions among the stations; transmitting a signal from a first station and receiving the signal at a second station; and performing one or both of: generating the signal based on a local clock at the first station and time adjustment information in a beacon transmission received by the first station, and sampling the signal at sample times based on a local clock at the second station and time adjustment information in a beacon transmission received by the second station.

34 Claims, 4 Drawing Sheets

U.S. PATENT DOCUMENTS

| | | | |
|---|---|---|---|
| 6,074,086 A | 6/2000 | Yonge, III | |
| 6,111,919 A | 8/2000 | Yonge, III | |
| 6,269,132 B1 | 7/2001 | Yonge, III | |
| 6,278,685 B1 | 8/2001 | Yonge, III | |
| 6,907,044 B1* | 6/2005 | Yonge et al. | 370/445 |
| 7,298,706 B2* | 11/2007 | Yoshida et al. | 370/252 |
| 7,315,524 B2* | 1/2008 | Ohmi et al. | 370/322 |
| 7,369,579 B2 | 5/2008 | Logvinov et al. | |
| 7,623,542 B2* | 11/2009 | Yonge et al. | 370/445 |
| 7,729,372 B2* | 6/2010 | Yonge et al. | 370/442 |
| 2002/0137462 A1 | 9/2002 | Rankin | |
| 2005/0190785 A1 | 9/2005 | Yonge, III et al. | |
| 2007/0025383 A1* | 2/2007 | Katar et al. | 370/442 |
| 2007/0025384 A1* | 2/2007 | Ayyagari et al. | 370/445 |
| 2007/0025391 A1 | 2/2007 | Yonge et al. | |
| 2007/0058732 A1 | 3/2007 | Riedel et al. | |

FOREIGN PATENT DOCUMENTS

| | | |
|---|---|---|
| WO | WO 2004/038980 | 5/2004 |

OTHER PUBLICATIONS

HomePlug Powerline Alliance Inc., "HomePlug AV White Paper," Doc ver. No. HPAVWP-050818, Aug. 2005, pp. 1-11.

Katar et al., "Beacon Schedule Persistence to Mitigate Beacon Loss in HomePlug AV Networks," May 2006, IEEE 1-4244-0113-05/06, pp. 184-188.

Lee et al., "HomePlug 1.0 Powerline Communication LANs—Protocol Description and Performance Results version 5.4," 2000, International Journal of Communication Systems, 20000 00:1-6, pp. 1-25.

* cited by examiner

TIME SYNCHRONIZATION IN A NETWORK

CROSS-REFERENCE TO RELATED APPLICATIONS

This application is a continuation of and claims the benefit of U.S. application Ser. No. 11/339,293, filed on Jan. 24, 2006, now U.S. Pat. No. 7,558,294 which claims the benefit of U.S. Application Ser. No. 60/702,717, filed on Jul. 27, 2005, and U.S. Application Ser. No. 60/705,720, filed on Aug. 2, 2005, each of which is incorporated herein by reference.

TECHNICAL FIELD

The invention relates to network protocols, and more particularly to time synchronization in a network.

BACKGROUND

Clock recovery techniques can be used to correct for clock error before decoding a packet or data stream. Various techniques for clock recovery are based on detecting portions of transmitted signals (e.g., a preamble that can also be used to detect the start of a data packet). Some of these techniques for clock recovery add substantial signaling overhead (e.g., 100 microseconds). Digital Video Broadcasting (DVB) standards for digital television include techniques for clock recovery based on a continuous stream including pilot carriers that can be used to synchronize a local phase-locked loop used for decoding the stream. However, such techniques may not be appropriate in networks in which multiple stations may be transmitting data.

SUMMARY

In one aspect, the invention features a method and corresponding system for communicating between stations in a network. The method includes providing repeated beacon transmissions from a coordinator station for coordinating transmissions among the stations; transmitting a signal from a first station and receiving the signal at a second station; and performing one or both of: generating the signal based on a local clock at the first station and time adjustment information in a beacon transmission received by the first station, and sampling the signal at sample times based on a local clock at the second station and time adjustment information in a beacon transmission received by the second station.

Implementations of this aspect of the invention may incorporate one or more of the following.

Generating the signal based on the local clock and the time adjustment information includes adjusting stored values based on the time adjustment information and performing digital-to-analog conversion of the adjusted values using the local clock.

Adjusting the stored values based on the time adjustment information includes interpolating the stored values according to the time adjustment information.

Generating the signal based on the local clock and the time adjustment information includes adjusting the local clock based on the time adjustment information and performing digital-to-analog conversion of stored values using the adjusted local clock.

Sampling the signal at sample times based on the local clock and the time adjustment information includes performing analog-to-digital conversion of the signal using the local clock and adjusting resulting sample values based on the time adjustment information.

Adjusting the sample values based on the time adjustment information includes interpolating the sample values according to the time adjustment information.

Sampling the signal at sample times based on the local clock and the time adjustment information includes adjusting the local clock based on the time adjustment information and performing analog-to-digital conversion of the signal using the adjusted local clock.

The coordinator station is the first station or the second station.

The signal is generated or sampled based on a frequency offset between a clock at the coordinator station and the corresponding local clock, the frequency offset being determined based on the time adjustment information.

The frequency offset is updated at least after every third received beacon transmission.

The frequency offset is updated after each received beacon transmission.

The frequency offset is calculated based on the time adjustment information and a value of the corresponding local clock captured when a predetermined portion of a beacon transmission was received.

The frequency offset is calculated based on at least one prior value of the frequency offset calculated after a prior beacon transmission.

A weight of the prior frequency offset in the calculation compared to a weight of an update term is selected to be lower in an initial phase to provide faster convergence, and higher in a later phase to provide increased filtering.

The signal is generated or sampled based on a time offset between the clock at the coordinator station and the corresponding local clock, the time offset being determined based on the time adjustment information.

The time adjustment information includes a time stamp value included in the beacon transmission based on a clock at the coordinator station.

The time stamp value includes the output of a counter that increments according to the clock at the coordinator station.

The time stamp value indicates a time at which a predetermined portion of the beacon transmission occurs.

The predetermined portion includes the start of a preamble of the beacon transmission.

The stations communicate over an alternating current (AC) power line medium, and each beacon transmission is synchronized to an AC power line waveform at the coordinator station.

The method further includes transmitting the signal from the first station to the second station during a time slot assigned to the first station according to at least one of the beacon transmissions received by the first station from the coordinator station.

Each beacon transmission includes information indicating a predicted time of a subsequent beacon transmission relative to a clock at the coordinator station.

The stations communicate over an alternating current (AC) power line medium, and each beacon transmission is synchronized to an AC power line waveform at the coordinator station.

After failing to successfully receive a recent beacon transmission, the first station determines the start of the time slot assigned to the first station based on: the clock at the first station, time adjustment information in a previous beacon transmission received by the first station from the coordinator station, and information in the previous beacon transmission indicating a predicted time of the recent beacon transmission.

Among the many advantages of the invention (some of which may be achieved only in some of its various aspects and implementations) are the following.

It enables stations to operate reliability and at higher data rates under various power line environments. It provides a channel adaptation mechanism that can be used in power line communication systems as well as other media that are affected by periodically varying channel impairments. It can provide a higher level of guaranteed quality of service (QoS). It provides accurate local clock synchronization without necessarily requiring expensive, highly accurate clocks.

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

System Overview

Figure 1:
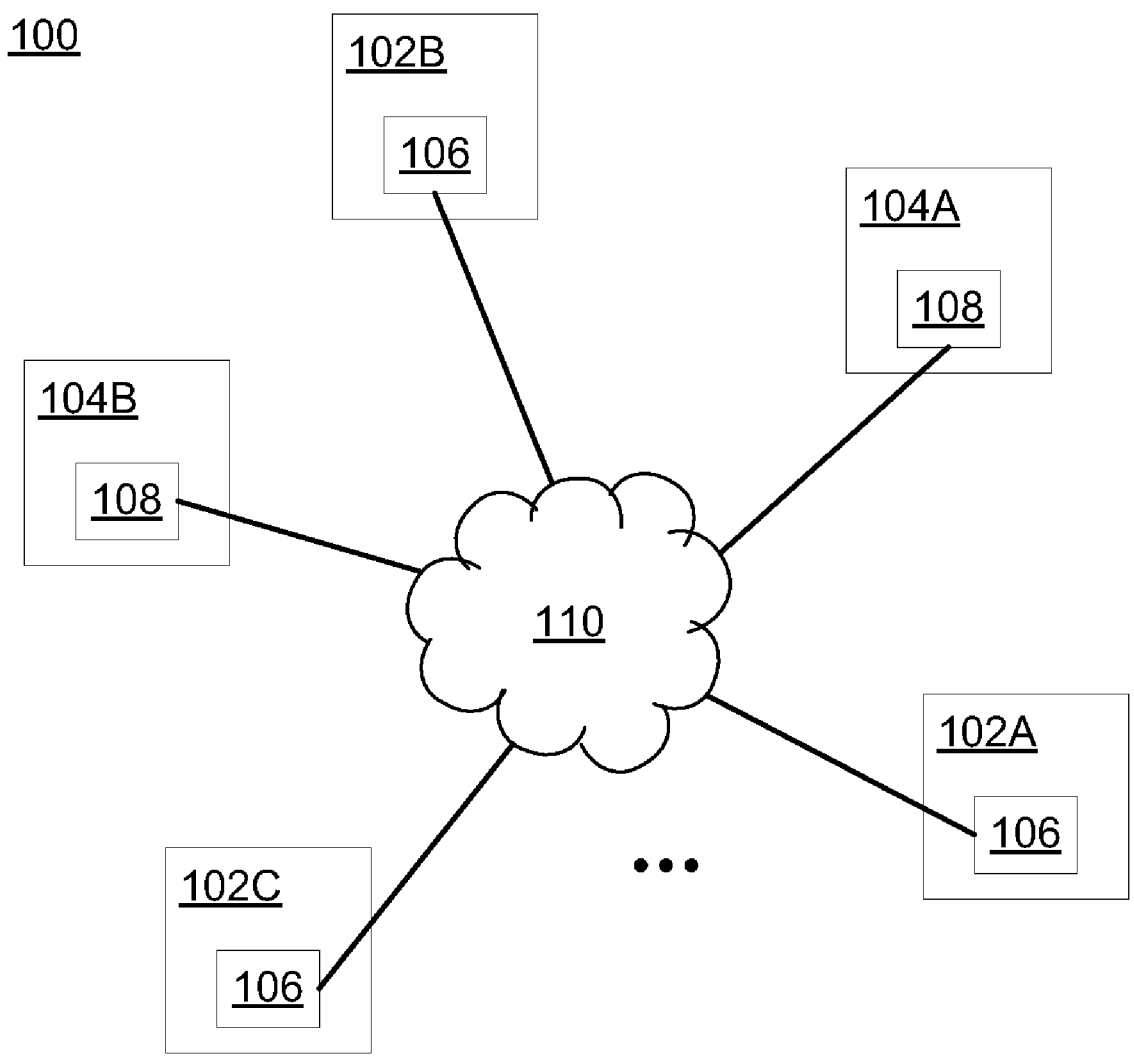
FIG. 1 is a schematic diagram of a network configuration.

As shown in FIG. 1, a network configuration 100 provides a shared communication medium 110 for a number of communication stations (e.g., computing devices, or audiovisual devices) to communicate with each other. The communication medium 110 can include one or more types of physical communication media such as coaxial cable, unshielded twisted pair, or power lines, for example. The network configuration 100 can also includes devices such as bridges or repeaters. The communication stations communicate with each other using predetermined physical (PHY) layer and medium access control (MAC) layer communication protocols. The MAC layer is a sub-layer of the data link layer and provides an interface to the PHY layer, according to the Open Systems Interconnection (OSI) network architecture standard. The network configuration 100 can have any of a variety of network topologies (e.g., bus, tree, star, mesh). The communication stations communicate with one another based on requests from software applications running on the hardware of the respective station.

The stations can have differences in the specific communication protocols used, and are still able to communicate with each other if the protocols are compatible. For example, network configuration 100 includes a first type of communication station including stations 102A, 102B, 102C that use a first MAC layer protocol "MAC-A" with a second type of communication station including stations 104A and 104B that use a second type of MAC layer protocol "MAC-B." The MAC-A and MAC-B protocols are compatible with each other and also use the same or at least compatible PHY layer protocols (e.g., one station uses a MAC-A protocol and a PHY-A protocol, and another station uses a MAC-B protocol and a PHY-B protocol, where PHY-A and PHY-B implement compatible signal modulation formats).

The co-existence of multiple MAC layer protocols can be used, for example, to allow improvements in capabilities and/or performance of the MAC layer while also allowing devices using a new MAC layer protocol to be compatible with legacy devices using an older MAC layer protocol that may exist in the network configuration 100. In some implementations, a dual-mode (DM) device can communicate with a legacy single-mode (SM) device using a first protocol, and can communicate with other DM devices using either the first protocol or a second protocol. The protocol to be used can be set by a communication mode that is determined at network setup time or when a device joins the network. For example, stations 104A and 104B include a network interface module 108 that uses MAC-A. Stations 102A, 102B, and 102C include a network interface module 106 that can use either MAC-A or MAC-B depending on the determined communication mode.

An example of a difference between the protocol layers (or "protocol stack") used by different types of devices (e.g., the DM and SM devices) is the use of a "central coordinator" (CCo) station for. The CCo is a communication station that is selected to provide certain coordination functions for at least some of the other stations in the network configuration 100. A set of stations operating under the coordination of a single CCo is called a Basic Service Set (BSS). Functions performed by the CCo include: authentication of stations upon joining the BSS, provisioning of identifiers for stations, and scheduling and timing of medium access. For example, the CCo broadcasts a repeated beacon transmission from which the stations in the BSS can determine scheduling and timing information. This beacon transmission includes fields that carry information used by the stations to coordinate communication. Though the format of each of the repeated beacon transmission is similar, the content typically changes in each transmission. The beacon transmission is repeated approximately periodically, and, in some implementations, is synchronized to a characteristic of the communication medium 110. In some cases, a Proxy Coordinator (PCo) can be used to manage stations that are "hidden" from the CCo (e.g., stations that do not reliably receive signals from the CCo).

There may also be differences in the access techniques implemented by the MAC-A and MAC-B protocols. For example, in one scenario, the MAC-A protocol uses a first access technique the MAC-B protocol is compatible with the first access technique and provides a second access technique. The MAC-A protocol uses a carrier sense multiple access with collision avoidance (CSMA/CA) technique to access the network configuration 100. The MAC-B protocol uses a hybrid approach that includes a contention-free period (CFP) in which a time division multiple access (TDMA) technique is used, and optionally includes a contention period (CP) in which a CSMA/CA technique is used. The contention-free period is scheduled and managed by the CCo to provide improved quality of service (QoS) for certain applications run on a device (e.g., audio and/or video applications). Other MAC protocols can use any one or combination of these or other access techniques.

In some implementations, the network interface modules use protocols that include features to improve performance when the network configuration 100 includes a communication medium 110 that exhibits varying transmission characteristics. For example, when the communication medium 110 includes AC power lines in a house, optionally coupled to other media (e.g., coaxial cable lines), the communication channel between any two stations provided by the communication medium 110 may exhibit periodic variation in noise characteristics and frequency response.

To improve performance and QoS stability in the presence of varying channel characteristics, such as power line noise, the CCo synchronizes the beacon transmissions with the frequency of the AC line (e.g., 50 or 60 Hz). There are typically variations in the phase and frequency of the AC line cycle from the power generating plant and local noise and load changes. This synchronization enables the time slots assigned to the various stations relative to a time reference in the beacon transmission to use consistent channel adaptation optimized for a particular phase region of the AC line cycle. The CCo also provides information in the beacon transmissions including a time stamp that can be used by the stations to synchronize local clocks with respect to a master network clock located at the CCo, as described in more detail below.

Another aspect of mitigating potential impairments caused by the varying channel characteristics involves using a robust signal modulation format such as orthogonal frequency division multiplexing (OFDM), also known as Discrete Multi Tone (DMT). OFDM is a spread spectrum signal modulation technique in which the available bandwidth is subdivided into a number of narrowband, low data rate channels or "carriers." To obtain high spectral efficiency, the spectra of the carriers are overlapping and orthogonal to each other. Data are transmitted in the form of symbols that have a predetermined duration and encompass some number of carriers. The data transmitted on these carriers can be modulated in amplitude and/or phase, using modulation schemes such as Binary Phase Shift Key (BPSK), Quadrature Phase Shift Key (QPSK), or m-bit Quadrature Amplitude Modulation (m-QAM).

PHY Layer Communication System Architecture

Any of a variety of communication system architectures can be used to implement the portion of the network interface module that converts data to and from a signal waveform that is transmitted over the communication medium. An application running on a station provides and receives data to and from the network interface module in segments. A "MAC Protocol Data Unit" (MPDU) is a segment of information including overhead and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line.

In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

There can be two types of PPDU structures, depending on whether the PHY-A or PHY-B protocol is being used. For example, the PHY-B signals can use denser OFDM carrier frequency spacing and correspondingly longer symbols.

Figure 2:
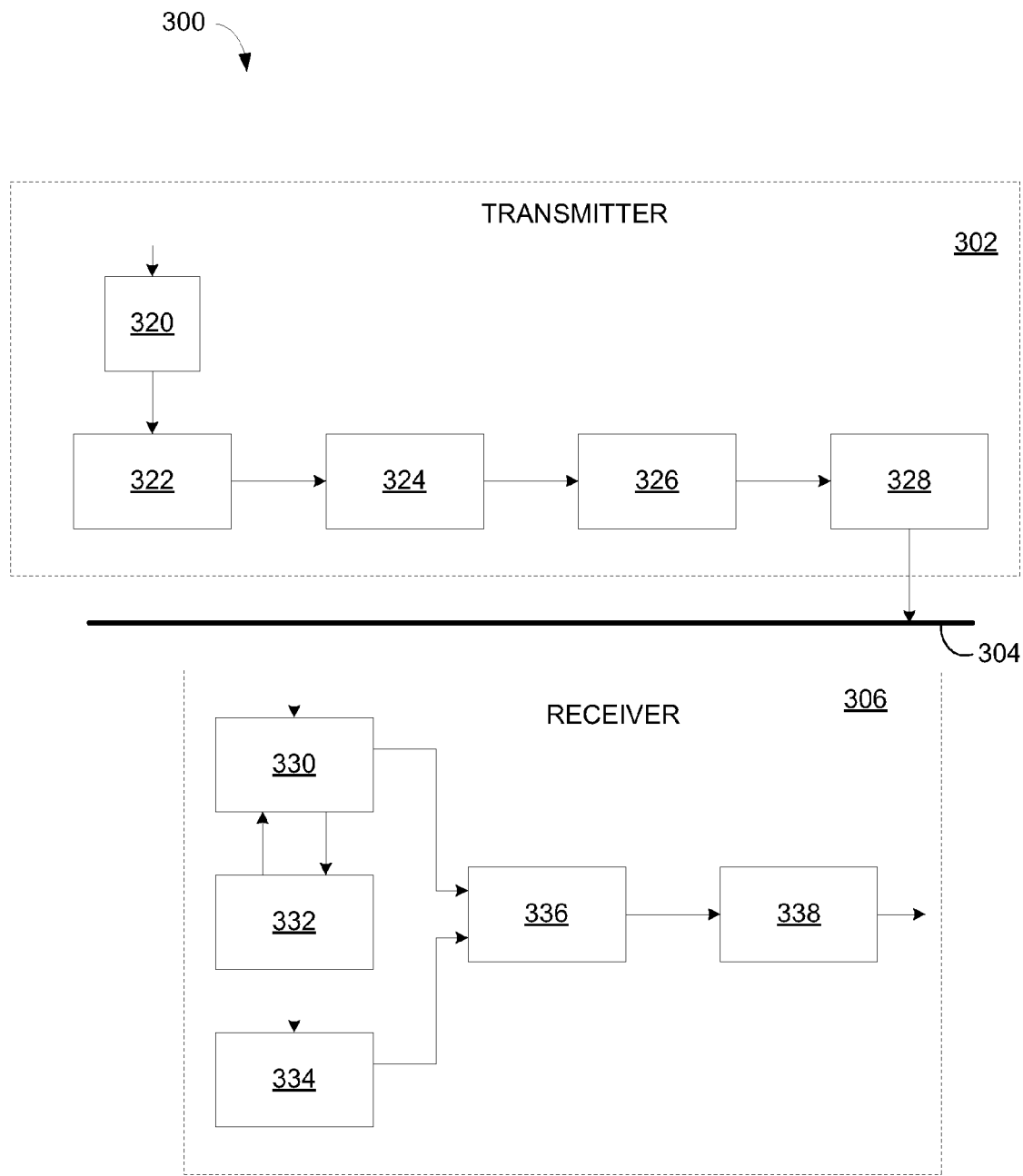
FIG. 2 is a block diagram of a communication system.

Referring to FIG. 2, a communication system 300 includes a transmitter 302 for transmitting a signal (e.g., a sequence of OFDM symbols) over a communication medium 304 to a receiver 306. The transmitter 302 and receiver 306 can both be incorporated into a network interface module at each station. The communication medium 304 can represent a path from one device to another over the power line network.

At the transmitter 302, modules implementing the PHY layer receive an MPDU from the MAC layer. The MPDU is sent to an encoder module 320 to perform processing such as scrambling, error correction coding and interleaving.

The encoded data is fed into a mapping module 322 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 322 also determines which of the carrier frequencies $f_1, \ldots, f_N$ within the OFDM bandwidth are used by the system 300 to transmit information. For example, some carriers that are experiencing fades can be avoided, and no information is transmitted on those carriers. Instead, the mapping module 322 uses coherent BPSK modulated with a binary value from the Pseudo Noise (PN) sequence for that carrier. For some carriers (e.g., a carrier i=10) that correspond to restricted bands (e.g., an amateur radio band) on a medium 304 that may radiate power no energy is transmitted on those carriers (e.g., $A_{10}=0$). The mapping module 322 also determines the type of modulation to be used on each of the carriers (or "tones") according to a "tone map." The tone map can be a default tone map, or a customized tone map determined by the receiving station.

An inverse discrete Fourier transform (IDFT) module 324 performs the modulation of the resulting set of N complex numbers (some of which may be zero for unused carriers) determined by the mapping module 322 onto N orthogonal carrier waveforms having peak frequencies $f_1, \ldots, f_N$. The modulated carriers are combined by IDFT module 324 to form a discrete time symbol waveform S(n) (for a sampling rate $f_R$), which can be written as $$S(n) = \sum_{i=1}^{N} A_i \exp[j(2\pi i n/N + \Phi_i)] \quad i=1 \qquad \text{Eq. (1)}$$

where the time index n goes from 1 to N, Ai is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 326 combines a sequence of consecutive (potentially overlapping) symbols into a "symbol set" that can be transmitted as a continuous block over the communication medium 304. The post-processing module 326 prepends a preamble to the symbol set that can be used for automatic gain control (AGC) and symbol timing synchronization. To mitigate intersymbol and intercarrier interference (e.g., due to imperfections in the system 300 and/or the communication medium 304) the post-processing module 326 can extend each symbol with a cyclic prefix that is a copy of the last part of the symbol. The post-processing module 326 can also perform other functions such as applying a pulse shaping window to subsets of symbols within the symbol set (e.g., using a raised cosine window or other type of pulse shaping window) and overlapping the symbol subsets.

An Analog Front End (AFE) module 328 couples an analog signal containing a continuous-time (e.g., low-pass filtered) version of the symbol set to the communication medium 304. The effect of the transmission of the continuous-time version of the waveform S(t) over the communication medium 304 can be represented by convolution with a function g(τ;t) representing an impulse response of transmission over the communication medium. The communication medium 304 may add noise n(t), which may be random noise and/or narrow-band noise emitted by a jammer.

At the receiver 306, modules implementing the PHY layer receive a signal from the communication medium 304 and generate an MPDU for the MAC layer. An AFE module 330 operates in conjunction with an Automatic Gain Control (AGC) module 332 and a time synchronization module 334 to provide sampled signal data and timing information to a discrete Fourier transform (DFT) module 336.

After removing the cyclic prefix, the receiver 306 feeds the sampled discrete-time symbols into DFT module 336 to extract the sequence of N complex numbers representing the encoded data values (by performing an N-point DFT). Demodulator/Decoder module 338 maps the complex numbers onto the corresponding bit sequences and performs the appropriate decoding of the bits (including deinterleaving and descrambling).

Any of the modules of the communication system 300 including modules in the transmitter 302 or receiver 306 can be implemented in hardware, software, or a combination of hardware and software.

Beacon Transmissions

Various stations in a network may generate regular beacon transmissions for various purposes. A repeated beacon transmission from a CCo to each of the stations in a BSS is called a Central Beacon (CB) transmission. The stations may communicate with each other in time periods between CB transmissions, provided the power line channel characteristics between any two communicating stations permits it.

One of the main functions of CB transmission is to carry medium allocation (or scheduling) information. The scheduling information allocates some of the time between CB transmissions as a contention period during which stations may contend for access to the power line medium. The scheduling information also allocates a contention-free period during which times slots are assigned to particular stations for access to the power line medium.

As described in more detail below, the CB transmission is synchronized with respect to the AC line cycle such that the time between CB transmissions (or "beacon period") is based on the underlying AC line cycle frequency. The CB transmission can be synchronized to the AC line cycle by transmitting the CB at a fixed time interval from a detectable feature of the power line waveform such as a zero crossing. The beacon period can be set to any multiple of a half of the AC line cycle period, for example, by waiting for a given number of zero crossings.

In some cases it is desirable to increase the beacon period to make more efficient use of the medium by reducing the percentage of time devoted to sending the "overhead" information in the CB transmission. There is also overhead information associated with transmissions from the stations. It may also be desirable to keep the beacon period small enough to provide a desired number transmission opportunities in a given length of time. Thus, the beacon period can be selected according to a trade-off between keeping overhead low and latency between transmission opportunities low. For example, in some implementations the beacon period is selected to be twice the AC line cycle period. In this case, when operating in power line environments with an AC line cycle frequency of 60 Hz, the beacon period would be approximately 33.33 msec. When operating in power line environments with an AC line cycle frequency of 50 Hz, the beacon period would be approximately 40 msec. Variations in the beacon period may occur due to drift in the AC line cycle frequency.

Figure 3:
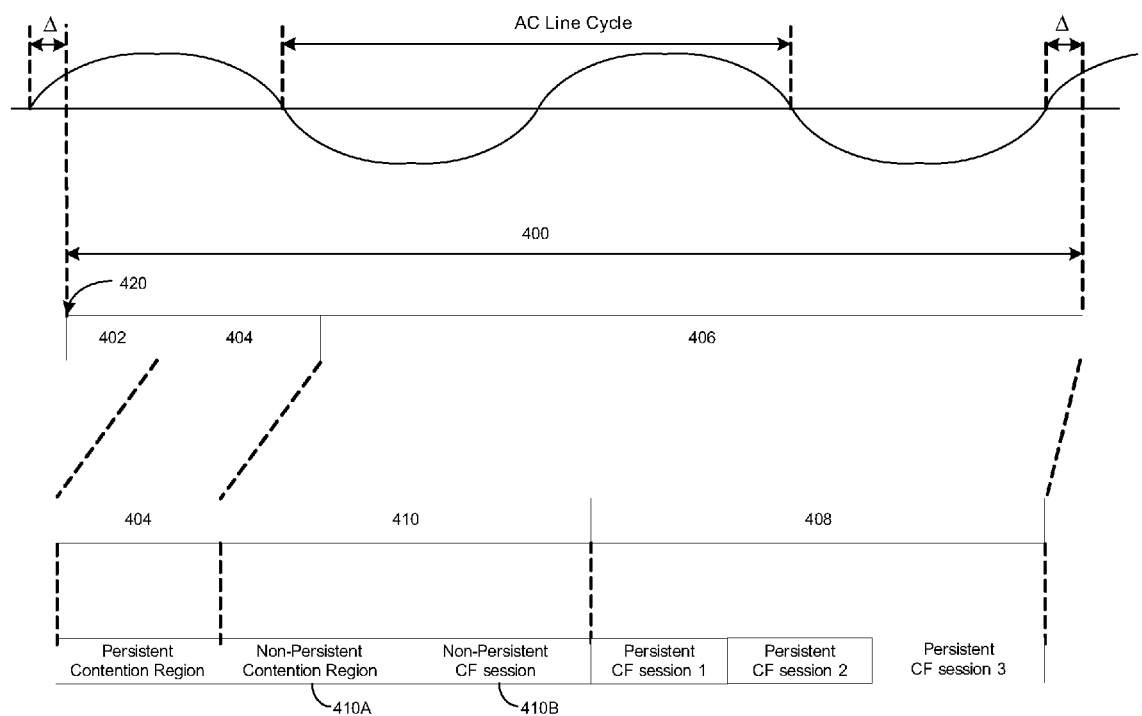
FIG. 3 is a timing diagram of a beacon period.

FIG. 3 shows the structure of an exemplary beacon period 400 which consists of a Beacon Region 402 followed by a Contention Region 404 and a Reserved Region 406. Optionally, the Beacon Region 402 can be followed by any number of Contention Regions and Reserved Regions in any order. The Contention Region 404 is a time in which stations can contend for permission to transmit using a shared medium access protocol such as CSMA/CA.

The Reserved Region 406 includes a contention-free period (CFP) 408 which includes time slots assigned for use by predetermined stations (e.g., using a TDMA protocol). The CFP 408 can be divided into contiguous time slots for each of the participating stations. Alternatively, the CFP 408 can be divided into sessions, each of which is divided into time slots for each of the participating stations. Therefore, a station may be allocated multiple times slots during the CFP 408.

The Contention Region 404 and the CFP 408 within the Reserved Region 406 are "persistent" in that they typically remain valid over multiple beacon periods. This persistent scheduled time allows stations that miss a beacon period for some reason to use previously stored schedule information, as described in more detail below. The Reserved Region 406 also includes a "non-persistent" period 410 that is not guaranteed to be valid for more than one beacon period. This non-persistent scheduled time allows rapid response to urgent time slot allocation requests, and time for network maintenance activities. For example, the non-persistent period 410 can include a time slot for a station to take a turn in transmitting a Discover Beacon used for setting up and maintaining the network. The non-persistent period 410 can use either or both of contention or contention-free access as needed. In this example, the non-persistent period 410 includes a non-persistent contention region 410A and a non-persistent contention-free "Extra Allocation" session 410B.

The Beacon Region 402 is the time allocated for the CCo to broadcast the CB transmission to the stations in the BSS. The CB transmission is sent using an OFDM waveform including preamble, frame control fields, and a beacon payload. In this example, the start 420 of the CB transmission (and thus the start of the Beacon Region 402) is synchronized to the AC line cycle at predetermined offset of Δ from the zero crossing. The beacon payload carries information used by the stations to determine the timing of the Reserved Regions and Contention Regions. In this example, one Contention Region 404 immediately follows the Beacon Region 402. If one or more Reserved Regions are present, additional Contention Regions may also be present in the beacon period 400.

Information describing the allocation of time slots within the beacon period is broadcast in the beacon payload within one or more beacon entries (BENTRYs). This information is used by stations within the network to coordinate sharing of bandwidth. The beacon payload carries three types of scheduling information:

Beacon Region information
persistent scheduling information
non-persistent scheduling information Beacon Region information is carried in a Regions BENTRY. This BENTRY contains the duration of Reserved Region 406 and the Contention Region 404. Allocations of time slots to transmitting stations for contention-free access can occur during the persistent CFP 408 in the Reserved Region 404 or during the non-persistent period 410.

Persistent CFP schedule information is carried in the Persistent Schedule BENTRY. The persistent CFP schedule is provided for use by transmitting stations requiring guaranteed QoS. It is critical that these transmitting stations obtain a sufficient amount of time during each beacon period to deliver their data and meet their loss rate and latency requirements. For example, a station is assigned a sufficient amount of time to include opportunities to retransmit lost data and still meet or exceed a minimum latency between successful transmissions. Since it is possible for a station to miss a CB transmission, this schedule is persistent.

The Persistent Schedule BENTRY has two fields that are used to interpret the persistence of schedule information:

Current Schedule Count Down (CSCD)
Preview Schedule Count Down (PSCD)

If the schedule is not changing, the schedule information reflects the current schedule and the Preview Schedule Count Down is zero. In this case, the Current Schedule Count Down indicates the minimum number of beacon periods for which the current schedule may be assumed valid. The Current Schedule Count Down value should not be smaller than the previous Current Schedule Count Down value minus one. In this way, stations that miss Beacons will know how long they may use the current schedule information they have.

When the schedule changes, the Preview Schedule Count Down is set to a non-zero value. This value indicates that the schedule information is a new schedule (not the current schedule) and when the new schedule will take effect. In this case, the Current Schedule Count Down previews the value that the new schedule will have for its Current Schedule Count Down during the first beacon period when it takes effect. The Current Schedule Count Down value in this case is a preview value and should not change from its initial value. In this way, stations that miss CB transmissions will know when they can use the new schedule information they have and for how long it will be valid. This approach allows a number of repetitions of the new schedule to ensure that all stations have the relevant information, even if some stations miss the CB transmission during the beacon period when the new schedule takes effect.

Figure 4:
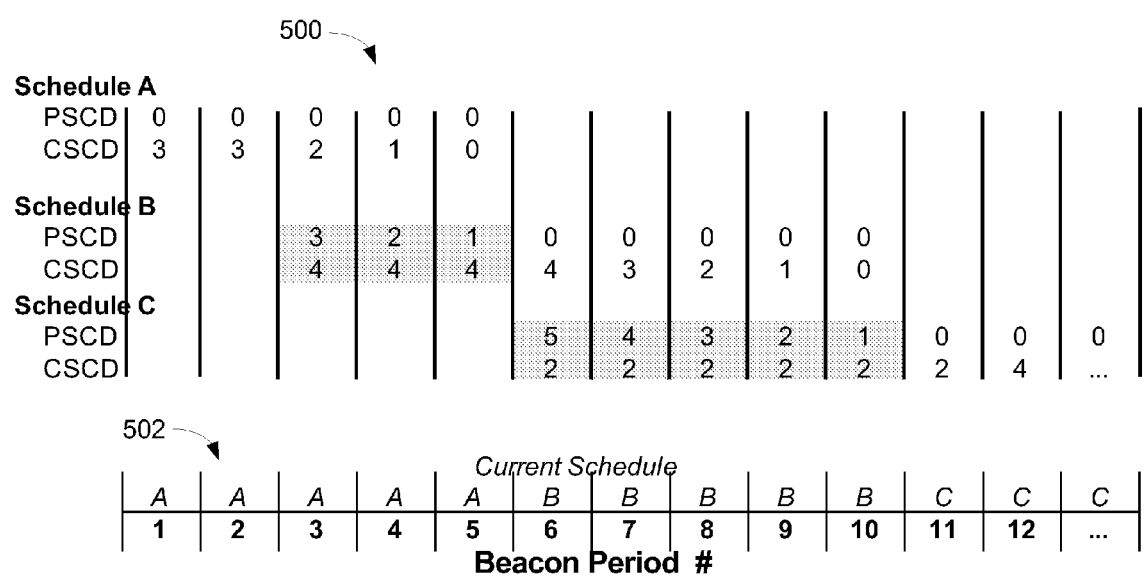
FIG. 4 is a diagram of schedules.

FIG. 4 shows examples of schedule changes. A Schedule Information chart 500 shows values for PSCD and CSCD in the BENTRY of the CB transmission sent by the CCo. A Current Schedule chart 502 shows which of two schedules, Schedule A or Schedule B, is in effect during a given beacon period. Initially, Schedule A is in effect. In Beacon Period 2, the CCo determines that the schedule should change to Schedule B. So, beginning in Beacon Period 3, the CCo includes a BENTRY containing Schedule B with the values of PSCD and CSCD shown for the schedule. (The previewed schedules are shaded in FIG. 4.) Although the CCo has the option of transmitting both Schedule A and Schedule B in separate BENTRYs, transmitting Schedule A is no longer necessary.

Once the CCo has announced Schedule B in Beacon Period 3, the earliest that Schedule B can be replaced by a new Schedule C is Beacon Period 11. That is because while the PSCD for Schedule B is non-zero, the CSCD is a preview of what the CSCD will be in the first Beacon Period that B is current (Beacon Period 6). Since the CCo chose a preview value of 4, Schedule B must be the current schedule for 5 Beacon Periods.

The CCo can update the schedule, including the size of time slots allocated to stations, in response to requests from stations or without an explicit request from a station. For example, the CCo can update the schedule based on information obtained from monitoring transmissions between stations over the shared communication medium. The CCo can adjust time slots to account for changes to channel capacity due to changes to the communication medium, or to account for changes in channel utilization.

One way the CCo is able to determine changes in various transmission characteristics is by reading information in the header fields of transmissions. For example, header fields can indicate the amount of pending data awaiting transmission, or "bit loading estimates" representing number of user data bits (e.g., excluding certain overhead data) that are being transmitted in a given amount of time (e.g., 1 microsecond). The CCo uses these fields to determine whether to increase or decrease persistent and/or non-persistent schedules.

The CCo is also able to respond to detected changes such as an increased error rate on a link between stations. For example, a station may be increasing a data rate by using a modulation with higher error rate that is more than compensated for by the increased data rate. The CCo can change the schedules to give more time to those stations that appear to need a higher data rate, or to optimize global characteristics such as total network throughput.

Persistence of schedule information improves reliability, but decreases responsiveness to urgent needs. A station that requests additional time for transmission during the CFP 408 might communicate its request to the CCo in the same Beacon Period (3) in which a new schedule (B) is announced. This calls for the transmitting station to wait for the announced schedule (B) to take effect before a revised schedule (C) can be broadcast. The revised schedule (C) must then count down before it becomes effective, so the transmitting station may be forced to wait several Beacon Periods before it can obtain the additional CFP time slot allocation it needs.

The Non-Persistent Schedule information indicates which stations are allocated a time slot during the Extra Allocation session 410B to satisfy urgent requests for more transmission time. A transmitting station must receive the CB transmission to utilize any Extra Allocation time slot it is given in a beacon period, which makes Extra Allocation time slots less reliable than the persistent CFP 408 time slots.

A transmitting station with a regular CFP 408 time slot allocation is allowed to start its transmission at its start time, as defined by the schedule, and should end its transmission by its end time, as defined by the schedule. If a transmitting station does not receive the CB transmission, but the transmitting station has the current effective schedule information (due to schedule persistence), it may start its transmission during its allocated time slot.

The CFP 408 time slot assigned to a transmitting station includes time after transmission of an MPDU during which the receiving station (or stations) can send a selective acknowledgement (SACK) according to a Selective Repeat Automatic Retransmission Request (SR-ARQ) approach. Each PPDU waveform representing an MPDU includes a preamble, frame control fields, and a payload made up of multiple segments or PHY blocks (PBs) that are encrypted independently. The preamble and frame control fields together are called the start-of-frame (SOF) delimiter. Each PB is contained in its own FEC Block. An MPDU may contain variable number of FEC blocks, depending on the data rate and payload duration. A SACK can be transmitted in response to a single MPDU, or a burst of multiple MPDUs (e.g., four) can be sent with a single SACK in response.

For example, within a time slot allocated to a transmitting station, the station may send multiple PPDUs each spanning an interval designated by the receiving station for a given channel adaptation. Each PPDU includes a SOF delimiter that can be used by the receiver to estimate phase and amplitude distortion within that adaptation interval for coherent demodulation. While a single long PPDU within a time slot may have lower overhead, transmitting multiple PPDUs enables each PPDU to use a different adaptation and provides a more accurate estimate of phase and amplitude distortion, which is likely to change in each adaptation interval. However, a single SACK can be used to acknowledge all of the MPDUs within the time slot.

The SACK format provides support for four SACK Type (SACKT) fields (one per MPDU in a burst of four MPDUs). The SACKT indicates whether:

All the PBs in the corresponding MPDU were received correctly (SACKT=0b00),

All the PBs in the corresponding MPDU were received with errors or the corresponding MPDU is not detected (SACKT=0b01), or A mixture of good and bad PBs were found in the corresponding MPDU (SACKT=0b11). In this case SACK information field (SACKI) is present. This field contains a bit map indicating the reception status of each PB within the MPDU.

Line-Cycle Synchronization

As described above, various techniques can be used to take into account varying channel characteristics of a shared communications medium. For stations communicating using a communication protocol without a CCo, such as the MAC-A protocol, different channel adaptation can be assigned to each of multiple phase regions of a periodically varying channel by a channel adaptation facility in a station that interacts with the channel adaptation facility at other stations, as described in U.S. patent application Ser. No. 10/787,544, entitled "Channel Adaptation Synchronized to Periodically Varying Channel," filed Feb. 26, 2004, incorporated herein by reference. For stations communicating using a communication protocol with a CCo, such as the MAC-B protocol, channel adaptation can be based on synchronizing the beacon transmission to the periodically varying channel. The stations can then perform channel adaptation according to the received beacon transmission without the need for each station to directly detect the phase of the periodically varying channel.

Line-cycle synchronization can be achieved by having the CCo track a particular point in the AC line cycle using a Digital Phase Locked Loop (DPLL) or equivalent. Using a filter or digital lock loop at the CCo is helpful to eliminate noise events or jitter in the measurement of the AC line cycle phase. The CCo uses its local tracking history to also predict future locations of the beacon transmissions and announce this to all stations in the beacon schedule. To ensure that stations with persistent allocations can transmit even when a CB transmission is not detected, the CCo provides information about the location of future CB transmissions within the beacon payload.

Clock Synchronization

The CCo includes a Network Clock that is used to provide a distributed time reference for the stations in the BSS. The CCo transmits a time stamp generated from the Network Clock in the CB transmission. For example, the time stamp can be a 32-bit value from a counter that increments with an edge (e.g., a rising edge) of the CCo's 25 MHz Network Clock. All timing of the network, including the beacon period and schedule, can be derived from the Network Clock. Each station synchronizes a local time reference (e.g., a digital phase locked loop) to the Network Clock. The start of transmission (e.g., start of the preamble) of the CB transmission occurs close (e.g., within less than a microsecond) to the time stamp value.

The Network Clock is used to synchronize the PHY layer signaling between stations to eliminate inter-carrier interference without the need for high accuracy clocks. A PHY layer clock at a transmitting station is used to perform digital-to-analog conversion of digital samples to generate a signal transmitted to a receiving station, and a PHY layer clock at the receiving station to perform analog-to-digital conversion of the received signal to recover digital samples. The PHY clocks at the stations should be accurate enough for the sample spacing at the two stations to have a stable relationship. For example, while a local clock at a station may be accurate enough to provide accurate sample times for sampling a PHY-A signal with 200 kHz carrier spacing, the local clock may cause inter-carrier interference when used for sampling a PHY-B signal having only a 25 kHz carrier spacing. The denser carrier spacing corresponds to longer symbols and more time for a frequency error between transmitting and receiving station clocks to lead to sampling errors. Other signal characteristics can also contribute to a signal's sensitivity to sampling errors. For example, higher order modulation (e.g., 16-QAM vs. 4-QAM) typically has tighter timing tolerances. The consequence of the sampling errors may be that the carriers are no longer strictly orthogonal. This sampling error may affect high-frequency carriers more than low-frequency carriers.

The PHY layer clock used to determine sampling times may be faster than the local clock that is synchronized to the Network Clock based on the time stamps. In some implementations the PHY layer clock is 75 MHz, and is adjusted based on the local 25 MHz clock. For example, if the local clock tracking the Network Clock is adjusted by 10 parts per million (ppm) (relative to 25 MHz), then the PHY layer clock is also adjusted by 10 ppm (relative to 75 MHz).

In one approach for clock synchronization, a station generates a synchronized local Network Clock estimate based on a free running lock clock and the most recently received Network Clock time stamp $NClk_n$, where n=0, 1, 2, . . . denotes successive CB transmissions. When the $n^{th}$ CB transmission is received, the receiving station captures and stores the value of the free running local clock ($LClk_n$, where n=0, 1, 2, . . . denotes successive CB transmissions) at the time of reception of the beginning of the preamble. During the corresponding beacon period, the station uses the values $NClk_n$ and $LClk_n$ to modify the value of the free running local clock LClk(t) to generate a synchronized local Network Clock estimate NClkE(t). In this notation, the values of the free running local clock and Network Clock estimate are indexed by the actual time t since the last CB transmission, where LClk(0)= $LClk_n$ and LClk(t) represents the local clock value at a time t after $LClk_n$ was captured.

The station estimates a frequency error $F_n$ and a time offset $T_n$ between the Network Clock and the station's local clock based on the values $NClk_n$ and $LClk_n$. Since the values of the counters implementing the Network Clock and the local clock may differ by some arbitrary amount, the propagation delay between the CCo and station can be ignored. Alternatively, if the propagation delay is known, this delay can be factored into the calculation of the offset. The following formulas can be used to estimate the frequency error and time offset.

for n=1 (the second received CB transmission):

$$F_1 = (NClk_1 - NClk_0)/(LClk_1 - LClk_0) - 1$$

$$T_1 = NClk_1 - LClk_1$$

for n>2:

$$F_n = F_{n-1} + w_f((NClk_n - NClk_{n-1})/(LClk_n - LClk_{n-1}) - 1 - F_{n-1})$$

$$T_n = T_{n-1} + F_n(LClk_n - LClk_{n-1}) + w_o((NClk_n - LClk_n) - (T_{n-1} - Fn(NClk_n - LClk_{n-1})))$$

The numbers $w_o$ and $w_f$ are weighting constants of the form $\frac{1}{2^k}$, where k is a positive integer. Larger values of k provide increased filtering of the uncertainty between each $NClk_n$ and $LClk_n$ pair caused by factors such preamble detection jitter. Larger values of k result in a longer period of time to achieve convergence to the correct estimate of frequency error. In an initial synchronization phase, a small value of k be used for the first few updates and increased to a final value.

After $NClk_n$, $LClk_n$, $F_n$, and $T_n$ are obtained (e.g., at the beginning of a beacon period), the synchronized local Network Clock estimate NClkE(t) can be obtained from the free running local clock LClk(t) as follows:

$$NClkE(t) = LClk(t) + T_n + F_n(LClk(t) - LClk_n)$$

Thus, the frequency error $F_n$ is used by stations in the network (other than CCo) to obtain a local clock that is synchronized to a master Network Clock at the CCo with a high degree of precision (e.g., within 1 ppm, or within 0.1 ppm).

Equivalently, instead of modifying the value of the free running local clock LClk(t) to generate a synchronized local Network Clock estimate NClkE(t), a station can resample a signal (e.g., before digital-to-analog conversion or after analog-to-digital conversion) to account for any discrepancy between the local clock LClk(t) and the Network Clock at the CCo. For example, when generating a signal for transmission, stored digital signal values can be resampled by interpolating the values according to the time difference LClk(t)−NClkE(t). Digital-to-analog conversion of the resampled signal is then performed using the local clock LClk(t). When recovering samples of a received signal, the samples generated using the local clock LClk(t) can be resampled by interpolating the sample values according to the time difference LClk(t)−NClkE(t).

Other approaches to clock synchronization based on the Network Clock time stamp can be used including, for example, using the time stamp as a reference for locking a digital phase locked loop to provide the synchronized local Network Clock estimate. The clock estimate updates can be performed after each beacon transmission reception, or less often, such as every other beacon transmission, or every third beacon transmission, and still provide increased timing accuracy. Many other implementations of the invention other than those described above are within the invention, which is defined by the following claims.

What is claimed is:

1. A method for communicating between stations in a network, the method comprising:

providing repeated beacon transmissions from a coordinator station for coordinating transmissions among the stations;

transmitting a signal from a first station and receiving the signal at a second station; and performing one or both of generating the signal based on a local clock at the first station and time adjustment information in a beacon transmission received by the first station; and sampling the signal at sample times based on a local clock at the second station and time adjustment information in a beacon transmission received by the second station.

2. The method of claim 1, wherein generating the signal based on the local clock and the time adjustment information comprises adjusting stored values based on the time adjustment information and performing digital-to-analog conversion of the adjusted values using the local clock.

3. The method of claim 2, wherein adjusting the stored values based on the time adjustment information comprises interpolating the stored values according to the time adjustment information.

4. The method of claim 1, wherein generating the signal based on the local clock and the time adjustment information comprises adjusting the local clock based on the time adjustment information and performing digital-to-analog conversion of stored values using the adjusted local clock.

5. The method of claim 1, wherein sampling the signal at sample times based on the local clock and the time adjustment information comprises performing analog-to-digital conversion of the signal using the local clock and adjusting resulting sample values based on the time adjustment information.

6. The method of claim 5, wherein adjusting the sample values based on the time adjustment information comprises interpolating the sample values according to the time adjustment information.

7. The method of claim 1, wherein sampling the signal at sample times based on the local clock and the time adjustment information comprises adjusting the local clock based on the time adjustment information and performing analog-to-digital conversion of the signal using the adjusted local clock.

8. The method of claim 1, wherein the coordinator station is the first station or the second station.

9. The method of claim 1, wherein the signal is generated or sampled based on a frequency offset between a clock at the coordinator station and the corresponding local clock, the frequency offset being determined based on the time adjustment information.

10. The method of claim 9, wherein the frequency offset is updated at least after every third received beacon transmission.

11. The method of claim 10, wherein the frequency offset is updated after each received beacon transmission.

12. The method of claim 9, wherein the frequency offset is calculated based on the time adjustment information and a value of the corresponding local clock captured when a predetermined portion of a beacon transmission was received.

13. The method of claim 12, wherein the frequency offset is calculated based on at least one prior value of the frequency offset calculated after a prior beacon transmission.

14. The method of claim 13, wherein a weight of the prior frequency offset in the calculation compared to a weight of an update term is selected to be lower in an initial phase to provide faster convergence, and higher in a later phase to provide increased filtering.

15. The method of claim 9, wherein the signal is generated or sampled based on a time offset between the clock at the coordinator station and the corresponding local clock, the time offset being determined based on the time adjustment information.

16. The method of claim 1, wherein the time adjustment information comprises a time stamp value included in the beacon transmission based on a clock at the coordinator station.

17. The method of claim 16, wherein the time stamp value comprises the output of a counter that increments according to the clock at the coordinator station.

18. The method of claim 16, wherein the time stamp value indicates a time at which a predetermined portion of the beacon transmission occurs.

19. The method of claim 18, wherein the predetermined portion comprises the start of a preamble of the beacon transmission.

20. The method of claim 1, wherein the stations communicate over an alternating current (AC) power line medium, and each beacon transmission is synchronized to an AC power line waveform at the coordinator station.

21. The method of claim 1, further comprising transmitting the signal from the first station to the second station during a time slot assigned to the first station according to at least one of the beacon transmissions received by the first station from the coordinator station.

22. The method of claim 21, wherein each beacon transmission includes information indicating a predicted time of a subsequent beacon transmission relative to a clock at the coordinator station.

23. The method of claim 22, wherein the stations communicate over an alternating current (AC) power line medium, and each beacon transmission is synchronized to an AC power line waveform at the coordinator station.

24. The method of claim 22, wherein, after failing to successfully receive a recent beacon transmission, the first station determines the start of the time slot assigned to the first station based on:
   the clock at the first station,
   time adjustment information in a previous beacon transmission received by the first station from the coordinator station, and
   information in the previous beacon transmission indicating a predicted time of the recent beacon transmission.

25. The method of claim 24, wherein the stations communicate over an alternating current (AC) power line medium, and each beacon transmission is synchronized to an AC power line waveform at the coordinator station.

26. The method of claim 1, wherein the beacon transmission received by the first station is transmitted by the coordinator station.

27. The method of claim 1, wherein the beacon transmission received by the second station is transmitted by the coordinator station.

28. The method of claim 1, further comprising:
   receiving the beacon transmissions from the coordinator station at a proxy coordinator station; and
   providing repeated beacon transmissions from the proxy coordinator station to one or more hidden stations that do not reliably receive the beacon transmissions from the coordinator station.

29. The method of claim 28, wherein the beacon transmissions provided by the proxy coordinator station include time adjustment information derived from one or more beacon transmissions received from the coordinator station.

30. The method of claim 29, wherein the first station is included in the one or more hidden stations.

31. The method of claim 30, wherein the beacon transmission received by the first station is transmitted by the proxy coordinator station.

32. The method of claim 29, wherein the second station is included in the one or more hidden stations.

33. The method of claim 32, wherein the beacon transmission received by the second station is transmitted by the proxy coordinator station.

34. A system, comprising:
   a plurality of stations in communication over a network; and
   a coordinator station configured to provide repeated beacon transmissions for coordinating transmissions among the stations;
   wherein at least one station is configured to perform one or both of
      generating a signal based on a local clock at the station and time adjustment information in a beacon transmission received by the station; and
      sampling a signal at sample times based on a local clock at the station and time adjustment information in a beacon transmission received by the station.

* * * * *